No. 612,795.  
W. H. BARKER.  
VEHICLE WHEEL.  
(Application filed Dec. 27, 1897.)  
Patented Oct. 18, 1898.
(No Model.)
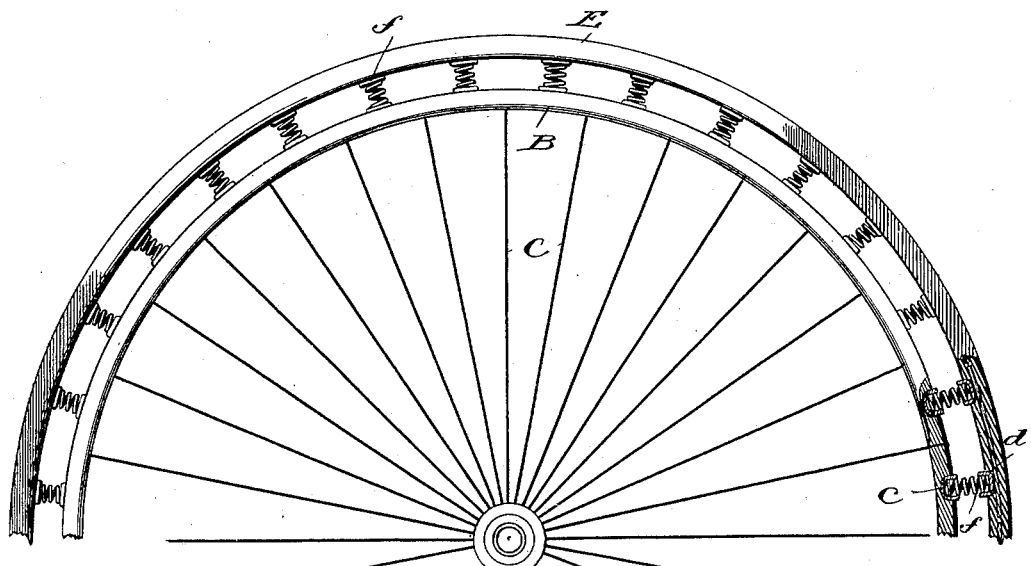
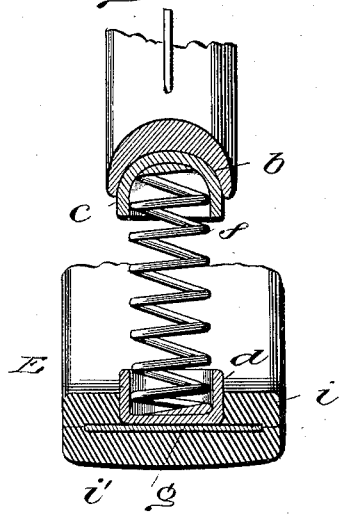
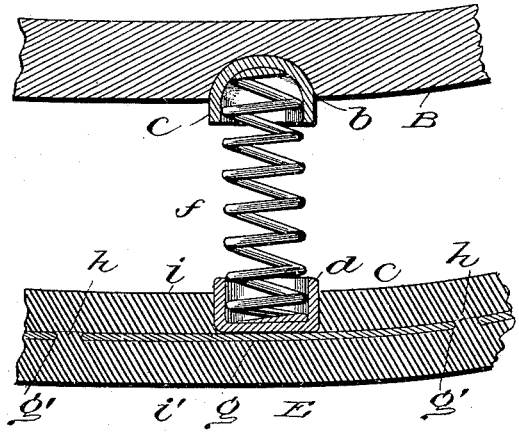
Witnesses:
Inventor  
William H. Barker,  
By R. S. & A. B. Lacey,  
his Attorneys

UNITED STATES PATENT OFFICE.

WILLIAM HENRY BARKER, OF MATAMORAS, PENNSYLVANIA.

VEHICLE-WHEEL.

SPECIFICATION forming part of Letters Patent No. 612,795, dated October 18, 1898.

Application filed December 27, 1897. Serial No. 663,665. (No model.)

*To all whom it may concern:*

Be it known that I, WILLIAM HENRY BARKER, a citizen of the United States, residing at Matamoras, in the county of Pike and State of Pennsylvania, have invented certain new and useful Improvements in Vehicle-Wheels; and I do hereby declare the following to be a full, clear, and exact description of the invention, such as will enable others skilled in the art to which it appertains to make and use the same.

My invention relates to improvements in bicycle and other vehicle wheels of that class in which a pneumatic tire or resilient tread portion is provided to absorb vibration.

The invention has for its object to provide a novel and improved construction of resilient tire embodying all the advantages and free from the disadvantages of the pneumatic tire.

To this end the invention consists in certain novel features of construction, combination, and arrangement of parts, as will be hereinafter more fully described and claimed.

In the accompanying drawings, forming part of this specification, Figure 1 is a part sectional and part side elevational view of a vehicle-wheel embodying my invention. Fig. 2 is a cross-sectional view of the wheel-rim and tire; Fig. 3, a longitudinal section of same.

Referring now by letters of reference to said drawings, A represents the hub, B the concavo-convex rim, and C the spokes, of a bicycle-wheel of the usual type.

The concaved outer face of the rim is formed with a continuous series of sockets $b$, arranged at proper intervals around its entire circumference for the reception of cups or thimbles $c$, and $d$ represents a corresponding series of cups or thimbles arranged on the inner face of the tire E. In these thimbles are seated the ends of stiff spiral springs $f$, which are preferably brazed thereto, although they may be secured in any other desired manner.

The tire E is of considerably greater diameter than the rim and is made of rubber and has embedded in it a continuous spring-metal band $g$, and this band is formed with orifices $g'$ for passage of teats or projections $h$, uniting the inner section $i$ and outer section or tread portion $i'$ of the tire. The cups $d$ are fitted in apertures $i^2$ in said section $i$ and are brazed to the band. In the process of manufacturing the tire two separate bands of unvulcanized rubber, constituting the said inner and tread sections $i$ $i'$, are assembled with the metallic band between them and the teats or projections $h$ extending through the orifices $g'$, and then said sections are united by vulcanizing. The band $g$ is made narrower than the tire, so that the sections when vulcanized together will be united at their overlapping side edges and centrally by the teats or projections $h$. By this construction a strong, durable, and resilient tire is provided.

Normally the springs $f$ maintain the tire and rim in proper relation; but when the tire is depressed or displaced inwardly in riding said springs permit it to yield and absorb vibration as effectually as the ordinary pneumatic tire. This construction of tire also embodies the essential advantages of the pneumatic tire in that the resilient action is localized—that is, the tire is displaced only at that portion of its periphery which is in contact with the ground, and the remaining portion thereof is not displaced or affected in any manner. This advantage is attained by making the tire itself resilient, so that it may yield or give at any portion of its periphery. I thus provide a tire which while embodying all the desirable qualities of the pneumatic tire possesses important and obvious advantages over the same.

It is obvious that such changes in the form, proportion, and minor details of construction of the parts as fairly fall within the spirit and scope of the invention may be made without departing from the spirit or sacrificing any of the advantages thereof. It is also obvious that the invention is not limited in its application to bicycle-wheels, but may be advantageously employed on other vehicle-wheels.

Having thus fully described my invention, what I claim as new and useful, and desire to secure by Letters Patent, is—

In a vehicle-wheel of the class described, the combination of a rim provided around its outer circumference with sockets, cups seated in said sockets, a resilient tire comprising an inner section, a tread-section and a spring-metal band interposed between the same, said inner section being provided with apertures and the two sections being vulcanized at their outer edges and connected intermediately thereof by integral teats or projections extending through openings in the band, cups seated in the apertures of the inner tire-section and brazed to the metal band, and resilience-springs interposed between the rim and tire and seated in said cups, substantially as described.

In testimony whereof I affix my signature in presence of two witnesses.

WILLIAM HENRY BARKER.

Witnesses:
A. W. BALCH, Jr.,
JOHN BALMORE.